Dec. 6, 1966     B. A. WATROUS, JR     3,289,333
EDUCATIONAL TOY BOOK
Filed Sept. 10, 1964     2 Sheets-Sheet 1
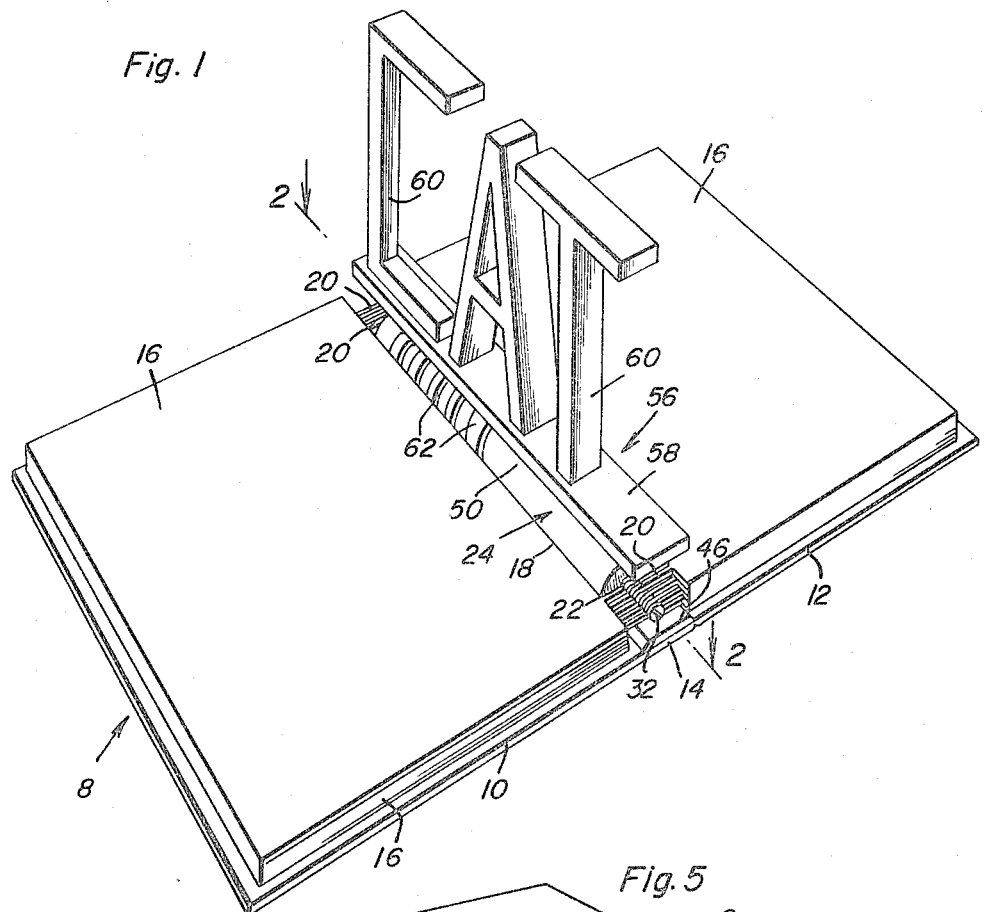
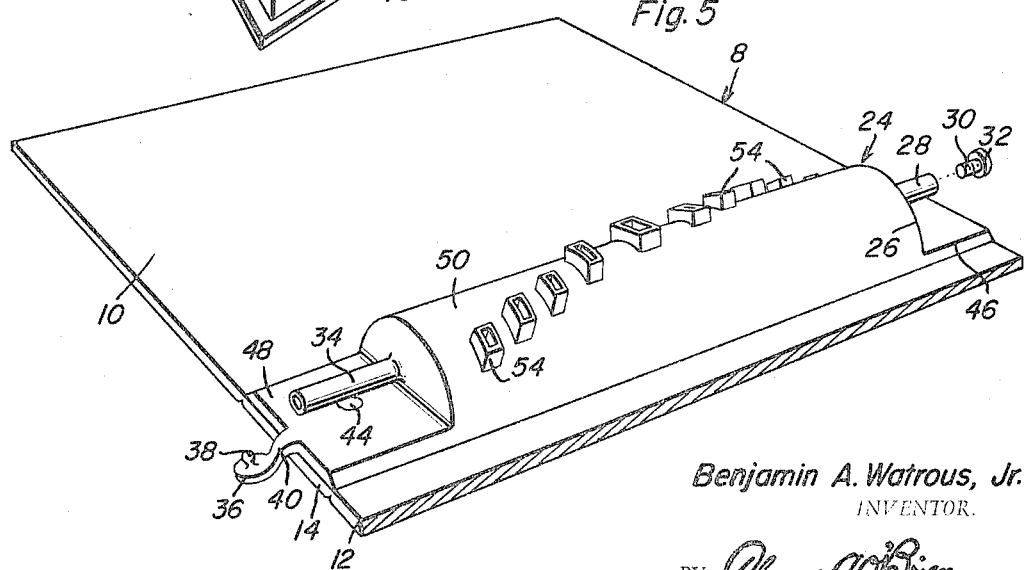
Benjamin A. Watrous, Jr.
INVENTOR.

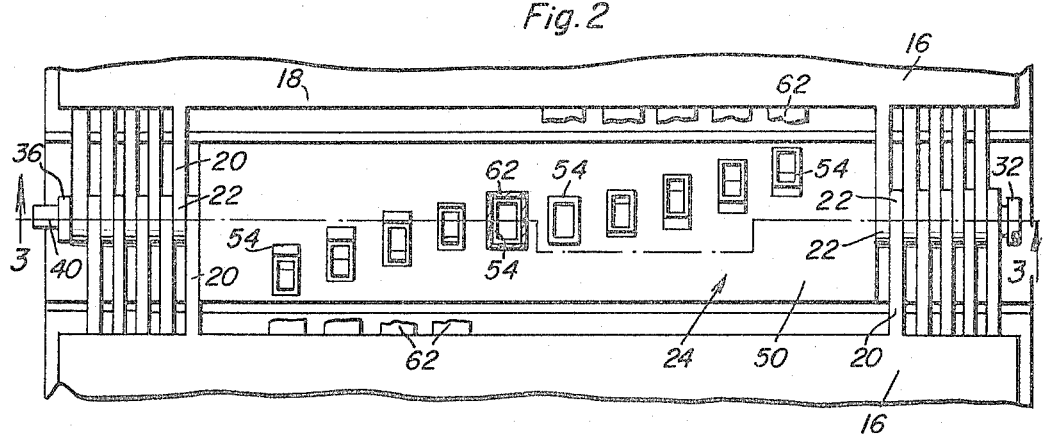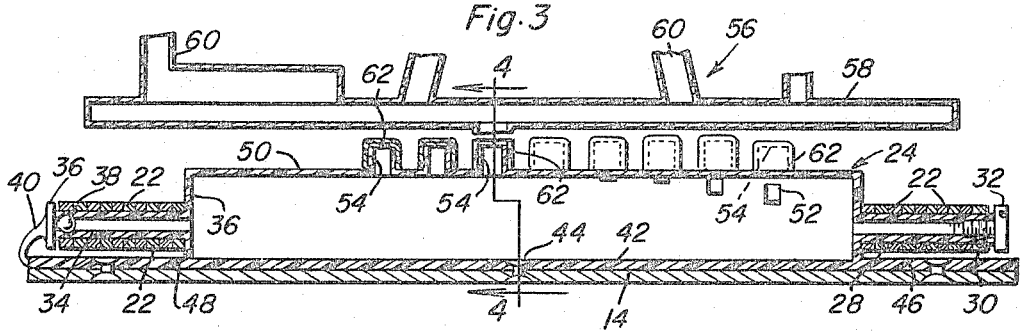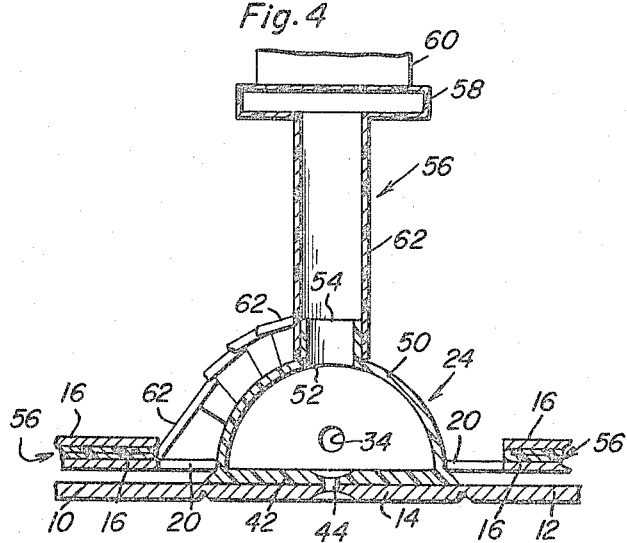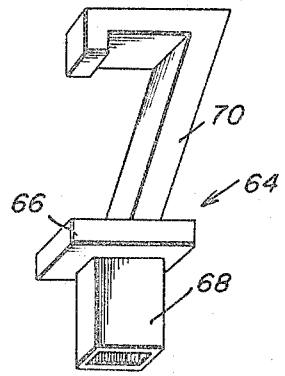
Benjamin A. Watrous, Jr.
INVENTOR.

3,289,333
EDUCATIONAL TOY BOOK
Benjamin A. Watrous, Jr., Annandale, Va., assignor of five percent each to James A. Ballard and Rosemary A. Horning, both of Suitland, Md.; Paul M. Dunlap, Landover Hills, Md.; Richard F. Rooney and Helen S. Weston, both of Washington, D.C.; and Robert S. Winokur, Silver Spring, Md.
Filed Sept. 10, 1964, Ser. No. 395,407
6 Claims. (Cl. 40—1)

This invention relates, generally categorized, to the art of teaching and, more particularly, to a visual type educational aid which is functionally designed and uniquely structurally adapted to familiarize a beginner, usually a child from one to nine years of age, with the delineation and appearance of well established characters which symbolize and stand for numbers, letters, words and varying objects.

An objective of the herein disclosed concept is to advance the field of teaching and learning which will be entertaining to youngsters, will enable them to acquire knowledge voluntarily and enthusiastically, will be acceptably popular among parents, will be endorsed and popularized by retailers, and will comply with manufacturing economies of manufacturers.

To the ends desired, this invention takes the form of an educational toy book (folder or loose-leaf type) embodying hingedly mounted leaves and complemental three dimensional characters which are interposed or sandwiched between opposed surfaces of the respective leaves and which are normally deflated or limp between the leaves (or pages) and are self-erecting when the leaves are progressively or otherwise selectively opened and closed.

It is within the purview of the instant concept to utilize any suitable pressure collapsed and released compressible and expansible self-standing characters independent of and actuatable by opening and closing the book leaves. On the other hand, it has been ascertained that pneumatic deflatable and inflatable self-erecting hollow plastic film characters are best suited for the end product desired.

Accordingly, it follows that novelty is predicated on the adoption and use of hollow airtight characters which are communicably mounted on a source of air, a simple manifold for example, supplied with air by the user (much in the manner of inflating a toy balloon or a figure toy) and wherein the hollow portion of each character is adapted to contain, without stretching and distorting, a given amount of air. Hence, the air flows from the source and is transferred from one character to the next and so on dependent on the opening and closing of the leaves and because of the fact that all of the inflatable and deflatable characters of the book in use have the same volumetric capacity for the air supply at hand.

In the toy book styles under advisement innumerable characters, such as those mentioned above can be employed. Then, too, surnames, given names, replicas of persons, animals, representations of states and the like can be provided for endless child and adult study and viewing. The inventive concept is applicable to a series of books employing comparable and related images for each book and supplemental books in the same theme category. For example, a first number book would contain and present for use, sequentially or at random, numbers ranging from 1 to 15, a second one from 16 to 30, and so on.

In carrying out the invention the "basic" book is characterized by principal components parts such as the front and back covers joined by a web or binding, a specially constructed manifold providing an air chamber and pages or leaves hinged on the end pintles, all capable of production from commercial plastics or a combination of the same with cardboard. Only the plastic film hollow characters or figures would need to be changed with a practical view of devising an endless series of interesting child guidance and educational books.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective showing the improved educational toy book constructed in accordance with the principles of the invention and also showing one of the projectible and retractible (inflatable and deflatable) characters in the self-erected viewable position occupied thereby;

FIGURE 2 is a view on an enlarged scale taken on the plane of the section line 2—2 of FIGURE 1, this view being fragmentarily shown;

FIGURE 3 is a view on the irregular section line with parts appearing in elevation, the section line denoted at 3—3;

FIGURE 4 is a fragmentary view primarily in section and taken approximately on the plane of the section line 4—4 of FIGURE 3 looking in the direction of the arrows;

FIGURE 5 is a view in perspective with certain of the component parts omitted in order to emphasize the construction and arrangement of the air storing and transferring manifold; and FIGURE 6 is a view in perspective of a single one of the inflatable and deflatable characters symbolizing a number.

With reference to the views of the drawings it will be seen that the book, a loose-leaf type, is denoted generally by the numeral 8. It comprises a front cover 10 at the left, a back cover 12 at the right and an intervening hinging and connecting web or binder 14 as shown in FIG. 1. The leaves or pages are all conveniently denoted here by the numeral 16. The pages are individually hingedly mounted. To this end the contiguous or inward edge portions 18 are provided at their respective opposite ends with spaced parallel outstanding hinging members or arms 20 terminating in attaching and hinging eyes 22. These eye-equipped hinging members are systematically attached to and anchored on the aforementioned source of air. More specifically, this air source comprises a simple manifold 24 (see FIG. 5) which is made of moldable plastic material, is elongated and semicircular in cross-section. One end portion 26 is provided with an outstanding axially located hinging pintle or journal which is denoted at 28 and which is here shown as hollow and closed by the screw-threaded stem 30 of a headed screw 32. The hinging eyes which are cooperable therewith embrace the pintle in systematic relationship as is clearly shown in FIGS. 2 and 3 in particular. There is a similar axially aligned hollow or tubular journal or pintle 34 which is connected with the opposite or lefthand end 36 as also shown in FIG. 3. This pintle also has the function of assembling and hingedly anchoring the eyes 22 on the hinging arms which are associated therewith. It is further noted that this pintle 34 has the additional function of a mouthpiece, this being the means by which the chamber portion of the manifold is charged with air. This is accomplished by blowing air through the bore of the pintle into the chamber of the manifold much in the manner followed when inflating a toy balloon. The means for closing the end thereof comprises a stopper 36 having a plug portion 38 which is plugged into the bore, said stopper being flexibly attached as at 40 to the manifold. The manifold has a bottom 42 which is superimposed on the aforementioned web or binding 14 (FIGS. 3 and 4) and is riveted or otherwise attached thereto as at 44. The extending end portions of the manifold are denoted at 46 and 48, respectively, and are likewise riveted in place. The end extension 48 serves for attachment thereto of the stopper linking member 40. The crown portion 50 of the manifold is provided with a plurality or series of discharge orifices one of which is denoted at 52 (FIG. 3). These orifices cooperate and are aligned with rectangular or equivalent upstanding adapter nipples 54 (which are progressively arranged from right to left in FIG. 5) in spiralling row (spaced apart) relationship. Thus the nucleus of the book 8 comprises the covers 10 and 12, the web 14, the manifold 24 superimposed and attached to the web, said manifold having air circulating nipples uniquely and progressively arranged and also having axially aligned outstanding journals 28 and 34 on which the hinging arms of the leaves or pages 16 are swingably mounted.

The expression "character" is used herein to identify and designate the changeable selectively usable projectible and retractible media which is employed to achieve the entertaining and visual educative and teaching result. As already suggested these characters are unlimited and consequently vary in delineation and appearance and may be generally thought of as fashioned to represent letters, numbers, words, objects and so on. A word character is shown in FIG. 1 and it is common in construction with the number character shown in FIG. 6. Each character is of hollow plastic film construction and delineated to represent the image desired. Take, for example, the word character in FIG. 1, this is denoted by the numeral 56 and comprises a horizontal hollow base 58 on which the letters 60 are communicatively mounted.

The base is provided with a flexible adapter and attaching neck 62 (see FIGS. 2 and 3) which is fitted airtight over the nipple 54 with which it is communicatively registrable. It will be understood that inasmuch as the characters 58 are inflatable and deflatable they are normally sandwiched or interposed between the closed leaves or pages 16 somewhat in the manner suggested, for example, in FIG. 4 at the left and right, respectively. On the other hand it will be understood that when the leaves or pages are parted and the air from the manifold chamber is allowed to enter the hollow portion of the overall character it is inflated and self-erecting. With reference again to FIG. 1 it is to be mentioned that while the three letter word is shown with the base 58 extending between and parallel with the edges 18 of the respective left and right leaves or pages, it can, of course, be turned around 90 degrees so that it will be then parallel with the top and bottom marginal edges of the book (assuming the book is in regular reading position). It is shown in the manner illustrated for clarity only.

With respect now to FIG. 6 its purpose is to demonstrate that the "characters" herein under advisement may assume any shape or form. The character 64 in FIG. 6 comprises or represents a number and embodies a generally rectangular hollow base 66, a depending flexible adapter and attaching neck 68 and the principal or body portion of the character is denoted at 70.

It will be evident from the foregoing that the preferred embodiment of the concept is the hereindisclosed toy book one in which three dimensional characters develop and stand erect as the pages or leaves are turned in regular book fashion. There are innumerable characters that can be used. The two shown herein are exemplary of the broad theme of the overall concept and should suffice to acquaint the reader with a comprehensive understanding of the overall subject matter. The air supply and return nipples 54 atop the manifold are systematically and orderly arranged to accommodate the layout or individual and collective arrangement of the characters in relation to the leaves of the book between which they are sandwiched and collapsed or flimsy when deflated and not in use. In fabricating the book all that is necessary is to assemble the basic component parts into interfitting relationship in the manner shown in the drawings wherein the base or bottom 42 and the extensions 46 and 48 of the manifold are riveted to the interior or top surface of the web 14 between the front and back covers 10 and 12.

In practice the stopper 36 is removed by manually detaching the plug 38 from the dual purpose member 34, the latter then constituting a mouthpiece. When the book is no longer used the air from the chamber of the manifold is released and the plug is put back to assume the position shown in FIG. 3. On the assumption that the book to be used is a simple progressive alphabetical letter book it will be obvious that when the book is completely closed (not detailed) all of the airtight three dimensional characters are collapsed and in a deflated state between their respective leaves. It is repeated that the characters are made of plastic film and will be hollow and airtight. All of the characters in any one book must have the same volumetric amount of air therein depending on size and shape. Very little air pressure is required inasmuch as the characters, made in accordance with the concept, will not stretch or become distorted. As the pages of the book are opened, let us say from left to right, and assuming that the chamber of the manifold is properly filled with air, it will be evident that as the weight of the page is lifted from the deflated characted it automatically inflates and stands up to assume the position suggested in FIG. 1. The book is now ready for use. By turning the next page, just as in any book, a gentle pressure, the weight of the hand on the page will force the air out of the first character back into the central air chamber and into the next letter, the next letter being, of course, communicatively joined with the chamber of the manifold. If the pages are skipped the characters between the pages turned will inflate. When the book is not in use simply remove the stopper, allow the air to escape, close the book and store it away on a shelf. The same procedure is followed in a number book, a word book and so on. The significant requirement for the different type books is that all the characters in any one book should have the same volume.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An aid to education comprising a book having at least two opposed hinged leaves, an inflatable and deflatable character adapted to be sandwiched and normally deflated between the opposing faces of said leaves, and an associatively cooperable source of air built into said book and with which said character is communicatively connected.

2. The structure according to claim 1, and wherein said means comprises a manifold providing an air chamber, said manifold having an air discharge nipple and said character having an air intake and discharge neck communicatively connected to said nipple.

3. The structure according to claim 1, and wherein said means comprises a manifold providing an air chamber, said manifold having an air discharge nipple and said character having an air intake and discharge neck communicatively connected to said nipple, said manifold having axially aligned pintles and said leaves having mounting and hinging members hingedly attached to their respectively cooperable pintles.

4. In combination, a manifold providing an air chamber axially aligned outstanding hinge pintles at its respective ends, at least one of said pintles being hollow and providing a mouthpiece for charging the chamber portion of said manifold with air, a book-like folder having front and back covers and an adjoining web-type binder, said manifold being mounted atop said web, and having at least one air delivery and return nipple, a pair of book leaves having means hingedly joining corresponding edge portions to said pintles, and a normally deflated air inflatable character interposed between mating faces of said leaves and having an air neck communicatively connected to said nipple.

5. The structure defined in claim 4, and wherein said mouthpiece is provided with an attached stopper which is adapted and arranged to open and close the mouthpiece at will.

6. The structure defined in claim 4, and wherein said character is hollow and made of plastic film, the hollow portion thereof being of a predetermined size and capacity capable of holding a given charge of air.

References Cited by the Examiner

UNITED STATES PATENTS

| 1,139,643 | 5/1915 | Cross | 46—34 |
| 3,092,927 | 6/1963 | Luchsinger | 46—34 |

FOREIGN PATENTS

| 1,053,916 | 3/1959 | Germany. |

EUGENE R. CAPOZIO, *Primary Examiner.*

W. J. CONTRERAS, *Assistant Examiner.*